US009681343B2

(12) United States Patent
Bakker et al.

(10) Patent No.: US 9,681,343 B2
(45) Date of Patent: Jun. 13, 2017

(54) APPARATUSES, METHODS AND COMPUTER PROGRAMS FOR A MOBILE TRANSCEIVER AND A BASE STATION TRANSCEIVER

(71) Applicant: Alcatel Lucent, Boulogne Billancourt (FR)

(72) Inventors: Hajo Bakker, Stuttgart (DE); Andreas Weber, Stuttgart (DE); Teck Hu, Melbourne, FL (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/414,962

(22) PCT Filed: Jul. 5, 2013

(86) PCT No.: PCT/EP2013/064252
§ 371 (c)(1),
(2) Date: Jan. 15, 2015

(87) PCT Pub. No.: WO2014/012803
PCT Pub. Date: Jan. 23, 2014

(65) Prior Publication Data
US 2015/0296430 A1   Oct. 15, 2015

(30) Foreign Application Priority Data

Jul. 17, 2012  (EP) .................................... 12305863

(51) Int. Cl.
*H04W 36/00* (2009.01)
*H04W 84/04* (2009.01)

(52) U.S. Cl.
CPC ...... *H04W 36/0094* (2013.01); *H04W 84/045* (2013.01)

(58) Field of Classification Search
CPC combination set(s) only.
See application file for complete search history.

(56) References Cited

U.S. PATENT DOCUMENTS

2006/0276212 A1\* 12/2006 Sampath et al. .............. 455/513
2013/0107868 A1\* 5/2013 Sadek et al. ................... 370/338

FOREIGN PATENT DOCUMENTS

EP           1 835 780 A2      9/2007
JP           2009-302686 A    12/2009
(Continued)

OTHER PUBLICATIONS

"$3^{rd}$ Generation Partnership Project; Technical Specification Group Radio Access Network; Evolved Universal Terrestrial Radio Access Network (E-UTRAN); X2 general aspects and principles (Release 10)," 3GPP TS 36.420, V10.2.0, XP050554049, pp. 1-12, (Sep. 2011).

(Continued)

*Primary Examiner* — Kabir A Timory
(74) *Attorney, Agent, or Firm* — Fay Sharpe, LLP

(57) ABSTRACT

Embodiments relate to apparatuses, methods and a computer programs for a mobile transceiver (100) and a base station transceiver (200). The mobile transceiver apparatus (10) comprises means for receiving (12) radio signals from two or more base station transceivers, the means for receiving (12) further having a receive sensitivity determining a possibility to decode data from a radio signal of one of the two or more base station transceivers, while also receiving radio signals from the other of the two or more base station transceivers. The mobile transceiver apparatus further comprises means for providing (14) sensitivity information on the receive sensitivity to an associated base station transceiver (200). The base station transceiver apparatus (20) comprises means for receiving (22) the sensitivity information on the receiver sensitivity and means for determining (24) configuration information on a measurement configuration for the mobile transceiver (100). The configuration (Continued)

information comprises information on a signal quality measurement at the mobile transceiver (100) on radio signals received from another base station transceiver and the configuration information comprises bias information for biasing the signal quality measurement, the bias information is based on the sensitivity information.

18 Claims, 5 Drawing Sheets

(56) References Cited

FOREIGN PATENT DOCUMENTS

| JP | 2010-503335 A | 1/2010 |
|----|---------------|--------|
| JP | 2013-509108 A | 3/2013 |
| RU | 2 418 388 C2 | 5/2011 |
| WO | WO 2008/037552 A1 | 4/2008 |
| WO | 2009/057544 A1 | 5/2009 |
| WO | 2011/053534 A1 | 5/2011 |

OTHER PUBLICATIONS

Madhavan Vajapeyam et al., "Downlink FTP Performance of Heterogeneous Networks for LTE-Advanced," International Conference on Communications Workshops, IEEE, XP031909270, pp. 1-5, Jun. 5, 2011.

International Search Report for PCT/EP2013/064252 dated Sep. 6, 2013.

* cited by examiner

APPARATUSES, METHODS AND COMPUTER PROGRAMS FOR A MOBILE TRANSCEIVER AND A BASE STATION TRANSCEIVER

Embodiments of the present invention relate to mobile communications, more particularly but not exclusively to radio resource management in heterogeneous networks.

BACKGROUND

In mobile communication networks heterogeneous architectures become more and more important. Heterogeneous Networks (HetNets) are networks, which utilize cell types of different sizes, as, for example, macro cells and small cells, such as metro cells, micro or pico cells, and femto cells. Such cells are established by base station transceivers for which their coverage areas are determined by their transmission power and interference condition. Small cells are cells having a smaller coverage area than macro cells. In some network scenarios the small cells' coverage area can be surrounded by the coverage area of a macro cell. The small cells can be deployed to extend the capacity of the network.

With regard to standardization, within the 3$^{rd}$ Generation Partnership Project (3GPP), HetNets have been added to the scope of the Long Term Evolution-Advanced (LTE-A) work item. Since the cells or base stations in such networks may utilize the same frequency resources, such architectures can suffer from interference created by the overlapping coverage areas of these cells. Therefore enhanced Inter-Cell Interference Coordination (eICIC) for co-channel HetNet deployment is one of the key techniques for LTE Release 10 (Rel-10). Co-channel HetNets comprise macro cells and small cells operating on the same frequency channel. Such deployments present some specific interference scenarios for which eICIC techniques are utilized.

In one example scenario, the small cells are open to users of the macro cell network. In order to ensure that such small cells carry a useful share of the total traffic load, User Equipment (UE) or mobile transceivers may be programmed or configured to associate preferentially with the small cells rather than the macro cells, for example, by biasing the Signal-to-Interference-and-Noise Ratio (SINR) or a Reference Signal Receive Power (RSRP) threshold at which they will select a small cell to associate with. Under such conditions, UEs near the edge of a small cell's coverage area may suffer strong interference from one or more macro cells. In order to alleviate such interference, some radio frames or sub-frames may be configured as "blank" or "almost blank" in a macro cell. A blank sub-frame may contain no transmission from the macro cell, while an "almost blank" sub-frame typically contains no payload data transmission and little or no control signaling transmission, but may contain reference signal transmissions in order to ensure backward compatibility with legacy terminals, which expect to find the reference signals for measurements but are unaware of the configuration of almost blank sub-frames. Almost blank sub-frames may also contain synchronization signals, broadcast control information and/or paging signals. The utilization of "blank" or "almost blank" sub-frames enables reduced or even suppressed interference for the small cell within these sub-frames. Hence, "blank" or "almost blank" sub-frames may be regarded as radio frames or sub-frames during which at least some radio resources are suspended from transmission, i.e. the transmission power of a cell or base station transceiver may be reduced on these radio resources.

Moreover, for coverage expansion, mostly for coverage of a small cell surrounded by one or more macro cells, within HetNets a bias value has been defined. For example, based on the bias value a mobile transceiver or User Equipment (UE) may request a handover from a macro cell to a small cell earlier than from one macro cell to another macro cell.

Another example scenario can arise with HetNets in which one or more cells operate on a Closed Subscriber Group (CSG) basis, and are therefore typically not open to users of the cellular network. For example, such a scenario can occur when CSG femto cells are being installed to cover households, but only allow a number of registered mobile to associate, while other mobiles are blocked. In this case, the small cells can cause strong interference to the macro cell UEs when these macro cell UEs come close to or enter the coverage area of the small cell CSG base station transceivers, however, without having the possibility to associate with them, i.e. to be handed over to them. It may then be beneficial for the open cells to indicate to their UEs the sub-frames in which they should make resource specific measurements, i.e. the sub-frames in which interference from one or more CSG cells is reduced or absent. In the following, to a base station transceiver may also be referred to as NodeB (NB) or as eNodeB (eNB) according to the 3GPP terminology.

However, to make use of blank or Almost Blank Sub-frames (ABSs) effectively (note that the term "ABS" is used, and should be understood to include both blank and almost blank sub-frames), signaling may be utilized between the cells, e.g. across the corresponding backhaul interface, known in LTE as the "X2" interface. For LTE Rel-10, it has been agreed that this X2 signaling will take the form of a coordination bitmap to indicate the ABS pattern (for example with each bit corresponding to one sub-frame in a series of sub-frames, with the value of the bit indicating whether the sub-frame is an ABS or not). Such signaling can help the cell to schedule data transmissions in the small cell appropriately to avoid interference (e.g. by scheduling transmissions to UEs near the edge of the small cell during ABSs), and to signal to the UEs the sub-frames, which should have low macro cellular interference and should therefore be used for measurements. Examples for such measurements are measurements for Radio Resource Management (RRM), which typically relate to handover, measurements for Radio Link Monitoring (RLM), which typically relate to detection of serving radio link failure, and measurements for Channel State Information (CSI) or Channel Quality Information (CQI), which typically relate to link adaptation on the serving radio link. In a CSG scenario, the ABS frames of the CSG cell can be used for scheduling data transmissions from other cells with reduced interference from the CSG cell.

In such an example scenario, Radio Resource Control (RRC) signaling can be utilized to indicate to the UEs the set of sub-frames which they should use for measurements (e.g., for RLM/RRM or CSI), where RRC is a signaling protocol standardized by 3GPP for control and configuration signaling.

SUMMARY

Embodiments are based on the finding that in HetNet scenarios eICIC and the utilization of partly suppressed radio resources, such as ABS and non-ABS, is not the only factor determining the system performance. Another contributing factor is the receiver of a mobile, i.e. its capability to cope with the different interference conditions. Such a receiver uses, aside from Radio Frequency (RF) components such as one or more antennas, filters, a Low Noise Amplifier (LNA), a mixer, etc., also digital signal processing concepts, such as Interference Cancellation (IC), spatial processing as beamforming, and spatial multiplexing, etc. It is a further finding that the overall performance of such a receiver in terms of a needed signal quality in order to decode data from a received signal depends on multiple factors and differs among the mobile transceivers. Moreover, in HetNets said individual receiver quality or sensitivity determines the conditions or the opportunities of the network on which mobile can be assigned to which cell. In other words, in a scenario where a small cell is surrounded by a macro cell, the sensitivity of a mobile receiver determines an individual coverage of the small cell within the macro cell, i.e. how far away from the small cell base station transceiver said mobile can be served by said small cell base station transceiver. In the CSG scenario, the receiver sensitivity of a mobile may determine how close it can get to a CSG base station transceiver, while still being served by another base station transceiver. Generally, the receiver sensitivity may determine when protected resources (e.g. ABS) should be used instead of unprotected resources (e.g. non-ABS) while the mobile gets closer to an interfering cell, farther away from a serving cell, respectively.

For example, within an LTE HetNet scenario pico cells can be added within a macro cell environment to enhance the LTE performance. Depending on the output power of the pico cells, the cell range might be very small, e.g. in the range of 30 to 100 meters. The coverage of an LTE pico cell is a function of the bias value. The larger the bias value, the wider is the pico cell coverage and hence more UEs can be served by the pico cell, which will lead to capacity enhancements as the pico cell can allocate its resources to a small amount of UEs. Consequently a UE within a pico cell will receive and can transmit more traffic than within the macro cell.

It is a further finding that handovers may be carried out at low SINR values. If no details of UE receiver performance or sensitivity are available at a base station transceiver, e.g. an eNB, a default bias value for all UEs will be selected which 'fits' to all UEs. According to the above this may yield suboptimal or reduced performance, since some mobiles with a high sensitivity could be served by another cell. With a default bias value, network assignment strategies of which mobile is assigned to which cell, would always be driven by the mobiles with the lowest sensitivity. If not, mobiles with the lowest sensitivity would not be able to handover to the desired cell, which in turn would yield to handover failures, ping pong effects, and reduced performance.

Embodiments are therefore based on the finding that application of an individual bias value based on the UE receiver performance may enable an individual improved or even optimal coverage expansion. In embodiments a base station transceiver, e.g. an eNB, may request information about the UE receiver performance, e.g. during a first initial set up of the mobile terminal or whenever the information is not available at the base station transceiver. During handover this information may be transferred between the base stations. Embodiments may therewith provide a better system performance as for high performance UEs the coverage expansion can be improved or even maximized (larger bias than a default one) leading to higher system throughput. Low performance UEs may not suffer performance problems in case a default bias would have been too large.

Embodiments provide an apparatus for a mobile transceiver for a mobile communication system. Hence, embodiments may provide said apparatus to be operated in or by a mobile transceiver. The apparatus will also be referred to as mobile transceiver apparatus. Embodiments may also provide a mobile transceiver comprising said mobile transceiver apparatus. Embodiments also provide an apparatus for a base station transceiver for a mobile communication system. Hence, embodiments may provide said apparatus to be operated in or by a base station transceiver. The apparatus will also be referred to as base station transceiver apparatus. Embodiments may also provide a base station transceiver comprising said base station transceiver apparatus. Embodiments may also provide a system comprising said mobile transceiver and/or said base station transceiver.

In embodiments the mobile communication system may, for example, correspond to one of the $3^{rd}$ Generation Partnership Program (3GPP)-standardized mobile communication networks, where the term mobile communication system is used synonymously to mobile communication network. The mobile or wireless communication system may correspond to, for example, a Long-Term Evolution (LTE), an LTE-Advanced (LTE-A), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc., or mobile communication networks with different standards, for example, a Worldwide Inter-operability for Microwave Access (WIMAX) network.

A base station transceiver can be operable to communicate with one or more active mobile transceivers and the base station transceiver can be located in or adjacent to a coverage area of another base station transceiver, e.g. a macro cell base station transceiver or a CSG base station transceiver. Hence, embodiments may provide a mobile communication system comprising one or more mobile transceivers and one or more base station transceivers, wherein the base station transceivers may establish macro cells or small cells, as e.g. pico-, metro-, or femto cells. A mobile transceiver may correspond to a smartphone, a cell phone, user equipment, a laptop, a notebook, a personal computer, a Personal Digital Assistant (PDA), a Universal Serial Bus (USB)-stick, a car, etc. A mobile transceiver may also be referred to as User Equipment (UE) or mobile in line with the 3GPP terminology.

A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, a remote radio head, a transmission point etc., which may be further subdivided in a remote unit and a central unit.

A mobile transceiver can be associated with the base station transceiver or cell. The term cell refers to a coverage area of radio services provided by a base station transceiver, e.g. a NodeB, an eNodeB, a remote radio head, a transmission point, etc. A base station transceiver may operate multiple cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas.

In other words, in embodiments the mobile communication system may correspond to a HetNet, which utilizes different cell types, i.e. CSG and open cells, and cells of different sizes, as, for example, macro cells and small cells, where the coverage area of a small cell is smaller than the coverage area of a macro cell. A small cell may correspond to a metro cell, a micro cell, a pico cell, a femto cell, etc. Such cells are established by base station transceivers for which their coverage areas are determined by their transmission power and interference condition. In some embodiments a small cell's coverage area can be surrounded by the coverage area of a macro cell established by another base station transceiver. The small cells can be deployed to extend the capacity of the network. A metro cell may therefore be used to cover a smaller area than a macro cell, e.g. a metro cell may cover a street or a section in a metropolitan area. For a macro cell the coverage area may have a diameter in the order of one or more kilometers, for a micro cell the coverage area may have a diameter below a kilometer, and for a pico cell the coverage area may have a diameter below a 100 m. A femto cell may be the smallest cell and it may be used to cover a household or gate section at the airport, i.e. its coverage area may have a diameter below 50 m. Thus, a base station transceiver may also be referred to as cell.

In embodiments the mobile transceiver is operable to receive radio signals from two or more base station transceivers. The mobile transceiver apparatus comprises means for receiving radio signals from the two or more base station transceivers. The means for receiving can correspond to a receiver operable to receive said radio signals. Such receiver or receiving means may comprise one or more antennas, filter or filter circuitry, an amplifier such as an LNA, conversion circuitry for converting an RF signal into a base band signal, an analog/digital converter and signal processing capability such as a Digital Signal Processor (DSP). The receiver may be compliant to one or more of the above described communication systems or standards. In embodiments the means for receiving or the receiver further has a receive sensitivity determining a possibility to decode data from a radio signal of one of the two or more base station transceivers, while also receiving radio signals from the other of the two or more base station transceivers. Hence, according to the above description, such means for receiving may decode data from the received radio signals. The ability to decode said data depends on the quality of the radio signals, e.g. in terms of a Reference Signal Strength Indicator (RSSI), a Reference Signal Receive Power (RSRP), Channel Quality Information (CQI), a Signal-to-Noise-Ratio (SNR), a Signal-to-Interference-and-Noise-Ratio (SINR), a Signal-to-Interference-Ratio (SIR), a Bit-Error-Ratio (BER), a Frame-Error-Ratio (FER), a block-error-rate, etc. And the ability to decode said data depends on the quality of the receiver or means for receiving and its signal processing algorithms. Such capability is also referred to as sensitivity of the means for receiving.

The mobile transceiver apparatus further comprises means for providing sensitivity information on the receive sensitivity to an associated base station transceiver. The means for providing may correspond to a sensitivity provider operable to provide the sensitivity information, which can be implemented in terms of analog or digital circuitry. For example, a controller may determine the sensitivity information by monitoring or determining signal quality measures at which data can be successfully decoded. In embodiments the receive sensitivity may correspond to any one of the above quality measures, e.g. a reception power of a reference signal from a base station transceiver. The receive sensitivity can, for example, correspond to a signal-to-interference-and-noise-ratio between a radio signal received from one of the two or more base station transceivers, the signals received from one or more other base station transceivers and background noise.

In embodiments a base station transceiver may provide one or more radio cells and the sensitivity information may refer or relate to a radio cell different from a radio cell the mobile transceiver is associated to. Hence, the sensitivity information may refer to a cell or base station transceiver the mobile transceiver may handover to in the future. That is to say that in embodiments sensitivity information may be based on radio signals of neighboring cells. A serving cell can then decide based on the sensitivity information, whether protected (e.g. ABS) or unprotected (e.g. non-ABS) resources are used to serve an associated mobile. Moreover, a serving cell may decide based on the sensitivity information when a hand over, if possible, can be triggered. Overall a more efficient use of the radio resources may be enabled and a higher system performance may be achieved.

In some embodiments the mobile transceiver apparatus is operable to receive information on a request for the sensitivity information from an associated base station transceiver. The mobile transceiver apparatus may then be further operable to respond to such a request with the sensitivity information. In some embodiments the sensitivity of the means for receiving may be predetermined, i.e. taken into account the overall capability of the mobile's components and signal processing gains. In such an embodiment the mobile provides the same sensitivity information independent from different interference scenarios. In other embodiments the mobile transceiver apparatus may update the sensitivity information such that different interference situations are taken into account. Hence, the means for receiving can be operable to update the sensitivity information and the means for providing can be operable to provide updated sensitivity information to the associated base station transceiver. This may provide the advantage that a more realistic or adapted receiver sensitivity can be considered as compared to embodiments with predetermined sensitivity information. Predetermined sensitivity information may be set more conservatively in order to avoid dropping connections or handover failures.

In further embodiments the means for receiving further comprises a signal processor being operable in one or more signal processing modes, wherein the receive sensitivity depends on the signal processing mode. For example, a signal processing mode may correspond to a successive interference cancellation mode and another second signal processing mode may correspond to signal processing without successive interference cancellation. Hence, if interference cancellation is applied the receiver sensitivity may be higher than without interference cancellation. Similar considerations may apply to the utilization and combination with other signal processing techniques, such as spatial multiplexing, beamforming, equalization concepts, combining techniques etc.

Embodiments further provide an apparatus for a base station transceiver for a mobile communication system. The base station transceiver apparatus comprises means for receiving sensitivity information on a receiver sensitivity of a mobile transceiver. The means for receiving can be implemented as an interface operable to receive the sensitivity information. Generally, the means for receiving can correspond to any kind of receiver, i.e. a wired or a wireless receiver. The base station transceiver apparatus further comprises means for determining configuration information on a measurement configuration for the mobile transceiver. The means for determining may correspond to a controller or a determiner operable to determine the configuration information. The means for determining may correspond to digital processing circuitry, such as a processor, a DSP, a microcontroller, etc. The configuration information comprises information on a signal quality measurement at the mobile transceiver on radio signals received from another base station transceiver, wherein the configuration information comprises bias information for biasing the signal quality measurement, the bias information being based on the sensitivity information.

Hence, in line with the above description the base station transceiver apparatus can make use of the sensitivity information and can determine an according bias value in terms of configuration information on a measurement. This may provide the advantage that individual biases can be used and thus different receiver sensitivities at the UEs can be exploited. Therewith an enhanced resource management and a higher network performance may be achieved.

In embodiments the base station transceiver apparatus may further comprise means for transmitting the configuration information to the mobile transceiver. The means for transmitting may correspond to a transmitter operable to transmit the configuration information, e.g. a transmitter compliant with one of the above communication systems or standards. The means for transmitting may comprise a mixer, filter circuitry, a Power Amplifier (PA), one or more antennas, etc.

The means for receiving can be operable to receive the sensitivity information from the mobile transceiver, where the mobile transceiver is associated to the base station transceiver. Hence, in some embodiments the sensitivity information can be received directly from an associated mobile transceiver. The means for receiving at the base station transceiver may then correspond to a wireless interface for communicating with the mobile transceiver. In embodiments the base station transceiver apparatus can be operable to transmit a request for sensitivity information to the mobile transceiver prior to reception of same from the mobile transceiver. The base station transceiver apparatus may further comprise means for providing the sensitivity information to another base station transceiver, e.g. in terms of another interface operable to provide the sensitivity information to the other base station transceiver. In other words, once a base station transceiver apparatus has received the sensitivity information of the mobile transceiver, it may provide the sensitivity information to another base station transceiver and avoid a retransmission of the sensitivity information, e.g. prior to or after a handover of the mobile transceiver to the other base station transceiver.

Accordingly, the base station transceiver apparatus may receive the sensitivity information from another base station transceiver. Hence, in embodiments the means for receiving the sensitivity information may also correspond to an interface towards another base station transceiver. That is to say the means for receiving can be operable to receive the sensitivity information from another base station transceiver. In some embodiments the means for receiving can correspond to an inter-base station interface, such as the X2 interface in LTE or LTE-A.

In embodiments the configuration information may refer to measurements relating to a handover between the base station transceiver and another base station transceiver. In other words, the base station transceiver apparatus may configure handover measurements referring to a neighboring cell at the mobile transceiver. These handover measurements may be biased according to the sensitivity information in line with the above. The bias may influence event triggered reporting of the mobile transceiver, which can be configured to report on a measurement event, e.g. to report when a signal quality of a neighboring cell fulfills a certain criteria, e.g. a certain receive power is determined or a certain quality is achieved relative to the serving cell. Such measurements can be biased using the bias information and, hence, the triggering of such events can be influenced in both directions, for a certain cell an event can be triggered earlier (bias advantaging said cell) or later (bias disadvantaging said cell).

The base station transceiver may generate a coverage area, which at least partly surrounds a coverage area of the other base station transceiver, which may correspond to a macro cell small cell scenario. The bias information in the configuration information can then be such that the coverage area of the (small cell) base station transceiver is enlarged by a measurement using the bias information compared to an unbiased measurement. In other embodiments a coverage area may be reduced, e.g. in a scenario with a CSG cell. Since a handover to the CSG cell may not be possible, measurements on said CSG cell may be biased in a way, that no reporting event is triggered or such that a reporting event can be used to determine when to schedule data for the mobile transceiver on protected resources (e.g. ABS), unprotected resources (e.g. non-ABS), respectively.

Embodiments further provide a method for a mobile transceiver for a mobile communication system. The mobile transceiver is operable to receive radio signals from two or more base station transceivers. The method comprises receiving radio signals from the two or more base station transceivers. The receiving has a receive sensitivity determining a possibility to decode data from a radio signal of one of the two or more base station transceivers, while also receiving radio signals from the other of the two or more base station transceivers. The method further comprises providing sensitivity information on the receive sensitivity to an associated base station transceiver.

Embodiments further provide a method for a base station transceiver for a mobile communication system comprising two or more base station transceivers. The method comprises receiving sensitivity information on a receiver sensitivity of a mobile transceiver. The method further comprises determining configuration information on a measurement configuration for the mobile transceiver. The configuration information comprises information on a signal quality measurement at the mobile transceiver on radio signals received from one of the two or more base station transceivers. The configuration information comprises bias information for biasing the signal quality measurement, the bias information being based on the sensitivity information.

Embodiments may further provide a computer program having a program code for performing one of the methods described above, when the computer program is executed on a computer or a processor. Some embodiments comprise a digital control circuit installed within the apparatus for performing the method. Such a digital control circuit, e.g. a Digital Signal Processor (DSP), needs to be programmed accordingly. Hence, yet further embodiments also provide a computer program having a program code for performing embodiments of the method, when the computer program is executed on a computer or a digital processor.

BRIEF DESCRIPTION OF THE FIGURES

Some embodiments of apparatuses and/or methods will be described in the following by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
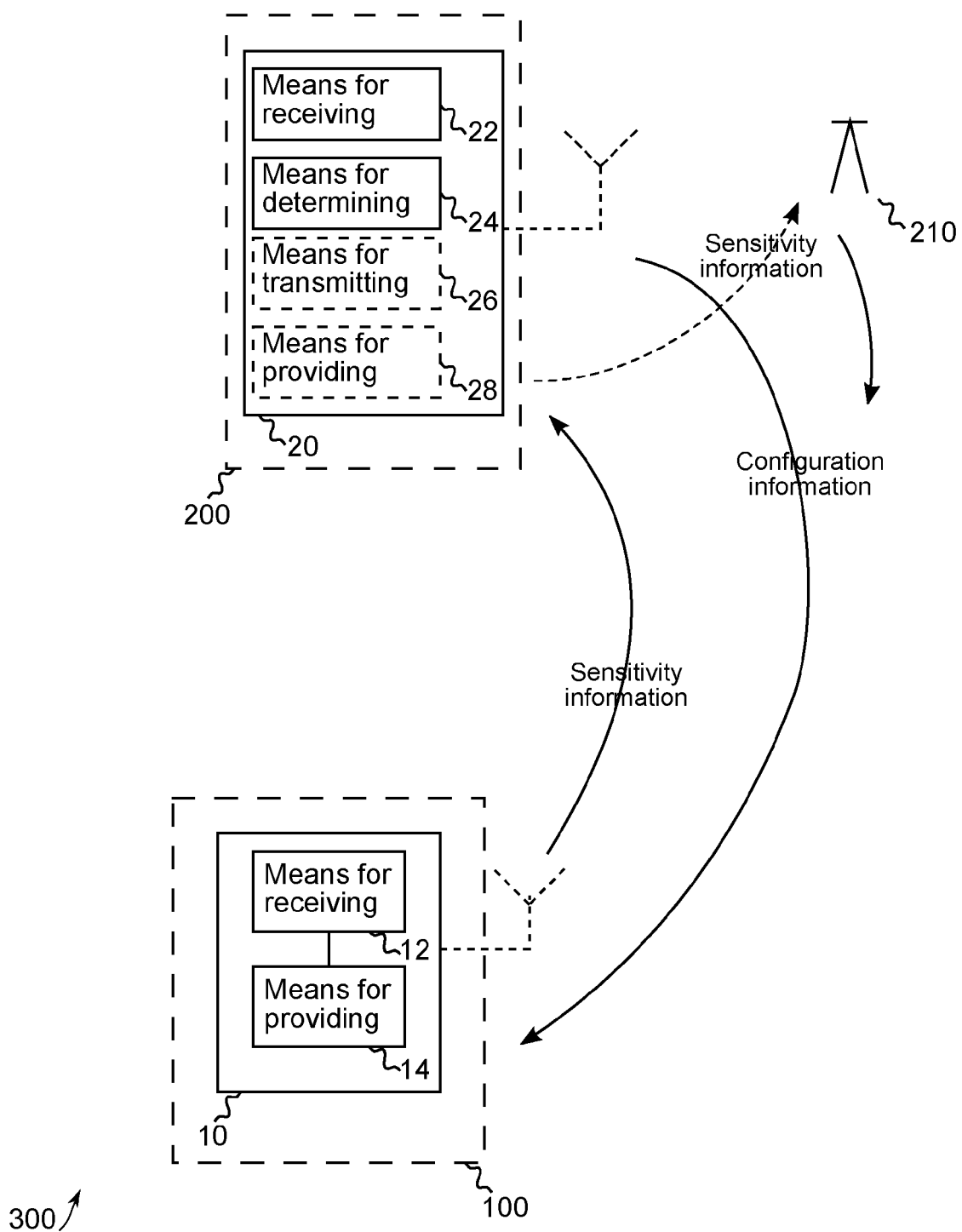
FIG. 1 shows a block diagram of an embodiment of a mobile transceiver apparatus and a block diagram of an embodiment of a base station transceiver apparatus.

FIG. 1 illustrates a block diagram of an embodiment of an apparatus 10 for a mobile transceiver 100 for a mobile communication system 300. The dashed lines indicate optional components. The mobile transceiver 100 is operable to receive radio signals from two or more base station transceivers 200, 210. The apparatus 10 comprises means for receiving 12 radio signals from the two or more base station transceivers 200, 210. The means for receiving 12 further has a receive sensitivity determining a possibility to decode data from a radio signal of one of the two or more base station transceivers 200, 210, while also receiving radio signals from the other of the two or more base station transceivers 210, 200. The apparatus further comprises means for providing 14 sensitivity information on the receive sensitivity to an associated base station transceiver 200. As indicated in FIG. 1, the means for receiving 12 is coupled to the means for providing 14. Moreover, the mobile transceiver 100 may comprise one or more antennas to transmit and receive according radio signals.

FIG. 1 also illustrates a block diagram of an embodiment of an apparatus 20 for a base station transceiver 200 for a mobile communication system 300. The apparatus 20 comprises means for receiving 22 the sensitivity information on the receiver sensitivity of the mobile transceiver 100. The base station transceiver apparatus 20 further comprises means for determining 24 configuration information on a measurement configuration for the mobile transceiver 100. The configuration information comprises information on a signal quality measurement at the mobile transceiver 100 on radio signals received from another base station transceiver 210. The configuration information comprises bias information for biasing the signal quality measurement and the bias information is based on the sensitivity information. As indicated in FIG. 1, the means for receiving 22 is coupled to the means for determining 24. Moreover, the base station transceiver 200 may comprise one or more antennas to transmit and receive according radio signals.

Moreover, FIG. 1 shows that the base station transceiver apparatus 20 further comprises means for transmitting 26 configuration information to the mobile transceiver 100. The means for receiving 22 is operable to receive the sensitivity information from the mobile transceiver 100 and the mobile transceiver 100 is associated to the base station transceiver 200. Furthermore, the apparatus 20 comprises means for providing 28 the sensitivity information to the other base station transceiver 210.

Figure 2:
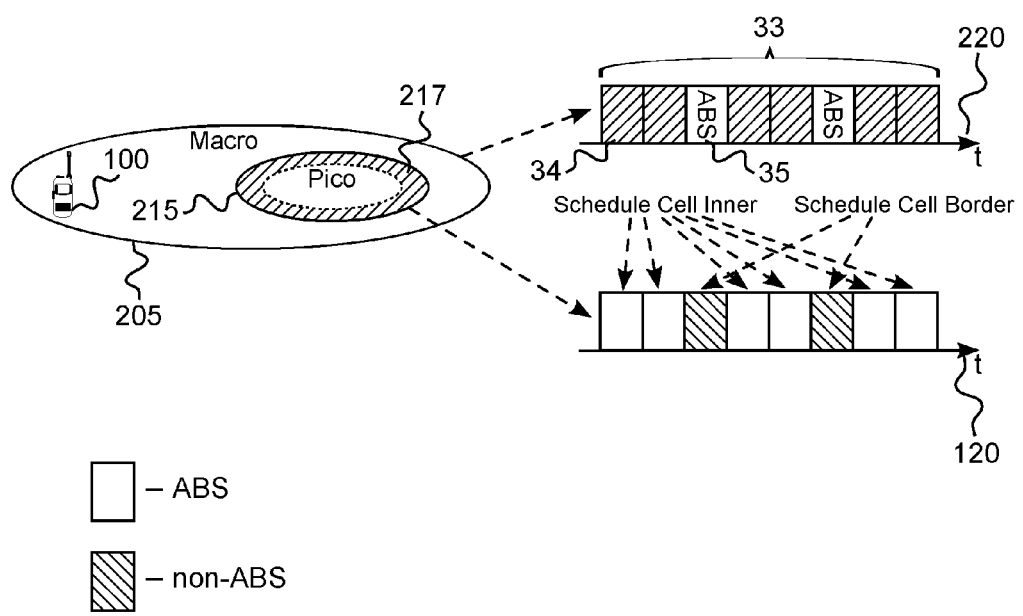
FIG. 2 illustrates an interference situation in an embodiment.

In the following embodiments, the base station transceivers 200, 210 are assumed to be eNBs of an LTE system 300. The mobile transceiver 100 is accordingly adapted. Furthermore, as it is shown in FIG. 2, it is assumed that base station transceiver 200 establishes a macro cell with a coverage area 205. The other base station transceiver 210 establishes small cell, e.g. a pico cell, with a coverage area 215.

FIG. 2 depicts a HetNet scenario with an embodiment of a base station transceiver 200 establishing the macro cell 205 surrounding the pico cell 215 for which the coverage 215 is shown with its cell border area 217. Moreover, FIG. 2 illustrates the ABS pattern or sequence 33 of the macro cell 205 on a time line 220, which is subdivided in radio frames. The sequence 33 comprises non-ABS 34 (hachured radio frames) and ABS 35 (blank radio frames), for each of which only a single one has a reference sign. Another time line 120 illustrates a scheduling sequence of the pico cell 215, which is also subdivided in corresponding radio frames. The two time lines 120 and 220 are in synchronization. There are radio frames, in which cell inner mobiles are scheduled (blank radio frames), and radio frames, in which cell border mobiles are scheduled (hachured radio frames). It is assumed that cell inner mobiles are located in the center part of the pico cell and cell border mobiles are located in the cell border part 217 of the pico cell. As can be seen from the two time lines 120 and 220 the pico cell schedules the inner cell mobiles during non-ABSs 34 and border cell mobiles during ABSs 35 of the macro cell.

In the scenario depicted in FIG. 2 eICIC is realized through ABSs, which are applied at the base station transceiver 200. During the macro ABS, the macro cell 205 suspends data transmission and transmits only pilots and broadcast signals. The pico cell 215 can schedule its cell border mobiles during ABS.

Coming back to the above described bias information, it is to be noted that higher bias values may expand the range for the pico cell 215 when using macro ABS. The number of ABSs may define the pico cell's border 217 capacity, e.g. the number of UEs that can be served and a maximum throughput in this area. The configuration information comprises a bias value as bias information. The bias value is a parameter that can be used to control the handover of the UE 100 from the macro cell 205 to the small cell 215 and also from the small cell 215 to the macro cell 205. With a positive bias value(s) the UE 100 is handed over from the macro cell 205 to the pico cell 215 earlier than in a macro cell/macro cell scenario and later from a small cell 215 to a macro cell 205, again compared to a macro cell/macro cell scenario.

Figure 3:
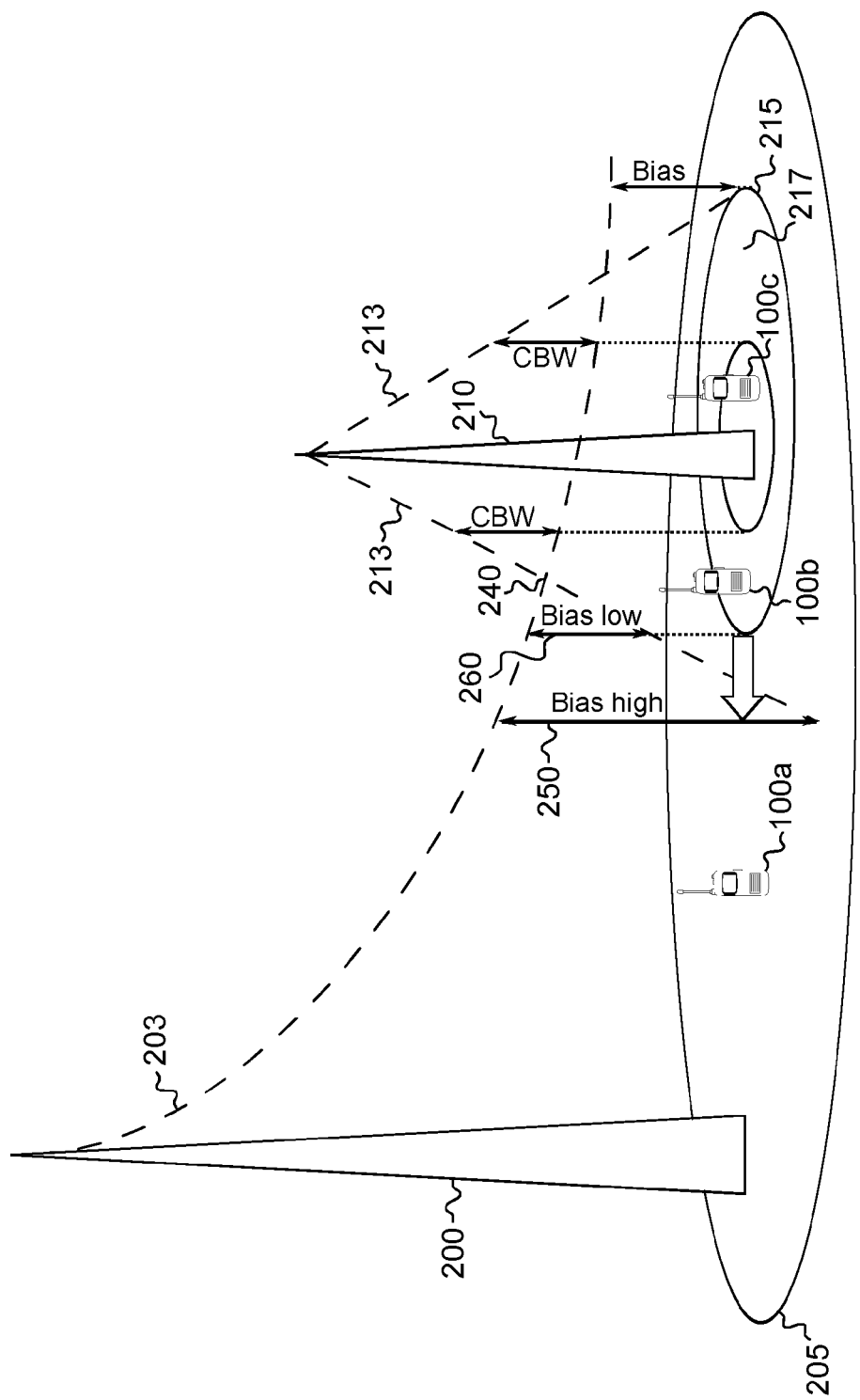
FIG. 3 illustrates another interference situation in an embodiment.

This is further illustrated in FIG. 3. FIG. 3 shows a macro cell base station transceiver 200 establishing the macro cell coverage area 205. Within the coverage area 205 of the macro cell base station transceiver 200 another base station transceiver 210 is located, which establishes a pico cell with coverage area 215, in line with FIG. 2. FIG. 3 also illustrates the cell border area 217 of the pico cell 210. Moreover, FIG. 3 shows a mobile transceiver 100 at three different positions 100a, 100b, and 100c. At position 100a the UE 100 is associated to the macro cell 200, it is also referred to as macro UE 100a. At position 100b the UE 100 is assumed to be associated with the pico cell 210 in the pica cells border area 217, to which it is also referred to as pico cell border mobile 100b. At position 100c the UE 100 is also associated to the pico cell 210 but it is located in the central area of the pica cell, hence it is also referred to as pico cell inner mobile 100e.

FIG. 3 illustrates receive levels 203 of the radio signals from the macro cell base station transceiver 200 at the different positions in the coverage area 205. It can be seen that the macro receive signal level 203 degrades the farther or the longer the distance to the macro cell base station transceiver 203. Accordingly the pico receive signal level 213 is shown in FIG. 3, which also degrades with the distance to the pico cell base station transceiver 210. Comparing the macro receive signal level 203 with the pico receive signal level 213 a break even position 240 can be located between the two base station transceivers 200, 210, at which the two receive signal levels 203, 213 are even. Conventionally a margin may be defined around this point at which unbiased handovers may be triggered. In the following the effect of biased handover will be described.

The bias value defines cell border of the pica cell 215 towards the macro cell 205. First, it is assumed that UE 100 moves from position 100a towards position 100b. The UE 100 reports its sensitivity information to the macro base station transceiver 200 and receives configuration information from the macro cell base station transceiver 200 including the bias information. The macro base station transceiver 200 may request the UE 100 to report the sensitivity information. In other embodiments the means for receiving 22 at the base station transceiver apparatus 20 can be operable to receive the sensitivity information from another base station transceiver, e.g. from the pico base station transceiver 210 or a neighboring other macro base station transceiver during a handover request for the UE 100.

The configuration information refers to measurements relating to a handover between the macro base station transceiver 200 and the other pico base station transceiver 210. In the present embodiment it is assumed that a positive bias value is indicated in the bias information.

Moreover, the receive sensitivity corresponds to a reception power of a reference signal from the pico base station transceiver 210, the UE 100 would need to successfully decode data from the radio signals received from the pico base station transceiver 210. Note that in other embodiments the receive sensitivity may correspond to a signal-to-interference-and-noise-ratio between a radio signal received from one of the two or more base station transceivers 200, 210, the signals received from one or more other base station transceivers 210, 200 and background noise. In other words, macro base station transceiver 200 provides one or more radio cells, i.e. the macro cell 205, and the sensitivity information relates to the pico cell 215, which is different from the macro cell 205 the mobile transceiver 100a is associated to.

The bias value is applied to a parameter cell specific Offset (Ocn), which is part of the RRC measurement configuration message towards the UE. Values for the Ocn parameter are defined within the Q-Offset Range. In the following, an excerpt from Technical Specification (TS) 36.331 is provided to detail Ocn and Q-offset:
from TS 36.331:
Ocn:
Ocn is the cell specific offset of the neighbour cell (i.e. cellIndividualOffset as defined within measObject-EUTRA corresponding to the frequency of the neighbour cell), and set to zero if not configured for the neighbour cell.
cellIndividualOffset
Cell individual offset applicable to a specific cell. Value dB-24 corresponds to −24 dB, dB-22 corresponds to −22 dB and so on.
Q-OffsetRange:
The IE Q-OffsetRange is used to indicate a cell or frequency specific offset to be applied when evaluating candidates for cell re-selection or when evaluating triggering conditions for measurement reporting. The value in dB. Value dB-24 corresponds to −24 dB, dB-22 corresponds to −22 dB and so on.

The Q-Offset Information Element (IE) can also be defined in Abstract Syntax Notation 1 (ASN.1):

```
Q- OffsetRange information element
-- ASN1START
Q-OffsetRange ::=   ENUMERATED {
            dB-24, dB-22, dB-20, dB-18, dB-16, dB-14,
            dB-12, dB-10, dB-8, dB-6, dB-5, dB-4, dB-3,
            dB-2, dB-1, dB0, dB1, dB2, dB3, dB4, dB5,
            dB6, dB8, dB10, dB12, dB14, dB16, dB18,
            dB20, dB22, dB24}
-- ASN1STOP
```

Hence, the macro base station transceiver 200 configures the UE 100 at position 100a with a positive bias value to be applied to the signals received from the pico base station transceiver 210. As the UE 100 moves from position 100a towards position 100b it will measure the radio signals received from the pico base station transceiver 210 and add the bias value to the result. If a high bias value is configured the biased received signal power of the pico cell 215 will match the macro receive signal level at position 250. If a low bias value is configured the biased received signal power of the pico cell 215 will match the macro receive signal level at position 260. However, in order to decode data from the radio signals of the pico base station transceiver 210 at position 250 a higher receiver sensitivity is needed than at position 260, since aside from the absolute reception power also the signal-to-interference-ratio for the signals of the pico base station transceiver 210 will be worse at position 250 than at position 260. Thus, if the macro base station transceiver 200 had no knowledge about the receiver sensitivity of the UE, a low bias value would have to be configured to avoid handover failures due to early handover triggering.

In other words the macro base station transceiver 200 generates a coverage area 205, which at least partly surrounds a coverage area 215 of the other pico base station transceiver 210. The bias information in the configuration information is such, that the coverage area 215 of the other pico base station transceiver 210 is enlarged by a measurement using the bias information compared to an unbiased measurement. The coverage expansion can be made dependent on the individual receiver sensitivity of a UE 100 and therewith be flexibly adjusted.

FIG. 3 also illustrates a Cell Border Window (CBW) separating cell border 217 from cell inner mobiles. The CBW can be added to the measurement result on the signals of the macro cell 205 of a pico UE, as indicated by FIG. 3. As can be seen the macro receive signal level 203 would then be increased by the CBW and compared to the pico receive signal level 213. When these values match the boundary between the central part and the border part 217 of the pico cell 215 can be detected. This boundary can, for example, be used to distinguish mobiles in the cell borer 217 being scheduled in ABSs of the macro cell 205 and mobiles in the cell inner part of the pica cell 215 being scheduled during non-ABSs of the macro cell 205. For example, UE RRC messages can be used to determine at which of the different locations a UE is at. E.g., event A3, cf. TS 36.331 of 3GPP, indicates that neighbor cell (e.g. pico cell 215) becomes better than the serving cell (e.g. macro cell 205) by an offset (handover margin or CBW).

If the UE 100 moves the other way, i.e. from position 100c towards position 100a, it can be configured by the small cell 215. In this case, the measurement results on the macro receive signal level 203 can be biased. In this direction a negative bias value may be added to the macro cell signal level 203 to achieve the same effect, a positive value can be added to the pico cell signal level 213, respectively.

In another embodiment the pico cell 215 is a CSG cell, which may also correspond to a femto cell. The UE 100, moving from position 100a towards 100c, is known to not being able to handover to the CSG cell 215. Hence, based on its receiver sensitivity, it can be configured to report, e.g. event A3, as late as possible, i.e. as close to the CSG base station transceiver 210 as possible. In this embodiment event A3 may trigger, when the UE 100 is scheduled on the ABSs of the CSG cell 215 and when data transmissions to the UE 100 can still succeed on non-ABSs of the CSG cell 215. In another embodiment it may trigger an ABS configuration request communicated from the base station transceiver 200 to the CSG base station transceiver 210 in order to improve the interference condition of the UE 100.

If the UE specific sensitivity information or bias capabilities are not known within EUTRA, e.g. at the macro base station transceiver 200, a default bias value would have to be used by the macro cell 205 (handover towards the small cell 215) and also by the small cell 210 (handover towards the macro cell 215). Based on specific UE implementations, e.g. successive interference cancellation (SIC) receivers, bias values up to −20 dB can be envisaged. That is to say, the means for receiving 12 at the mobile transceiver apparatus 10 can comprise signal processing means to carry out SIC. In embodiments, the mobile transceiver apparatus 10 may further comprise a signal processor being operable in one or more signal processing modes, wherein the receive sensitivity depends on the signal processing mode. A first signal processing mode may correspond to a SIC mode and the second signal processing mode may correspond to signal processing without SIC, having influence on the receiver sensitivity. Other low cost UEs might only operate with higher bias values, e.g. −8 dB.

Hence, embodiments can make use of the UE capability with respect to the bias value, i.e. receiver sensitivity information, which is made available from the UE towards the serving eNB and can be forwarded to target eNB during the handover request. If the target eNB 210 serves a small cell 215, the UE specific bias value can be used for a handover back to previous serving macro cell eNB 210. If the target eNB serves a second macro cell, the bias can be used for handover from this second macro cell towards a small cell which is located within the coverage of this second marco cell.

The sensitivity information may be provided by the UE during call set up. For example, an extension of the RRC message "UECapabilityInformation" transmitted from the UE towards the eNB as result of the "UECapabilityEnquiry" request from the eNB can be used. The IE UE-EUTRA-Capability can be used for transfer of UE related information and can, for example, be extended with a UE specific bias value. In further embodiments instead of transmitting the bias value, the UE may maps the bias value on the scale of an Ocn value, in case the bias values do not map to the granularity of the Ocn (e.g. bias in 0.5 to 1 dB steps versus 2 dB steps for Ocn) in order to use the same granularity of the bias value and the Ocn. Furthermore, the bias value might be mapped to different sets of bias values (e.g. −20 to −16 dB, −15 to −10 dB etc.) representing different UE classes, e.g. UEs with high, medium or low performance.

Between the base station transceivers, e.g. during handover preparation, a transfer of the extended "UECapabilityInformation" within the X2 message "Handover Request"

can be carried out. In embodiments sensitivity information can be part of said X2 message.

Embodiments may provide improved or even optimal UE specific setting of the bias value, leading to different pico cell expansions, leading to optimized or improved pico cell throughput.

Figure 4:
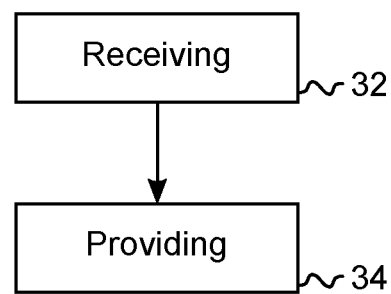
FIG. 4 shows a block diagram of a flowchart of an embodiment of a method for a mobile transceiver apparatus.

FIG. 4 shows a block diagram of a flowchart of an embodiment of a method for a mobile transceiver 100 for a mobile communication system 300. The mobile transceiver 100 is operable to receive radio signals from two or more base station transceivers 200, 210. The method comprises a step of receiving 32 radio signals from the two or more base station transceivers 200, 210. The receiving 32 has a receive sensitivity determining a possibility to decode data from a radio signal of one of the two or more base station transceivers 200, 210, while also receiving radio signals from the other of the two or more base station transceivers 210, 200. The method comprises a further step of providing 34 sensitivity information on the receive sensitivity to an associated base station transceiver 200.

Figure 5:
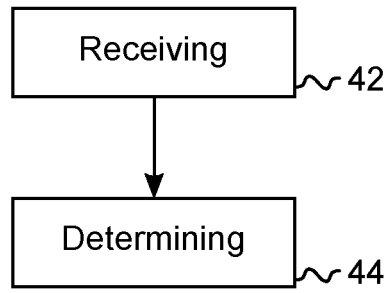
FIG. 5 shows a block diagram of a flowchart of an embodiment of a method for a base station transceiver apparatus.

FIG. 5 shows a block diagram of a flowchart of an embodiment of a method for a base station transceiver 200, 210 for a mobile communication system 300, which comprises two or more base station transceivers 200, 210. The method comprises a step of receiving 42 sensitivity information on a receiver sensitivity of a mobile transceiver 100. The method comprises the further step of determining 44 configuration information on a measurement configuration for the mobile transceiver 100. The configuration information comprises information on a signal quality measurement at the mobile transceiver 100 on radio signals received from one of the two or more base station transceivers 200, 210. The configuration information comprises bias information for biasing the signal quality measurement, the bias information being based on the sensitivity information.

Moreover, embodiments may provide a computer program for performing one of the above methods, when the computer program is executed on a computer or processor or a programmable hardware component.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is operable to perform a certain function, respectively. Hence, a "means for s.th." may as well be understood as a "means being adapted or suited for s.th.". A means being adapted for performing a certain function does, hence, not imply that such means necessarily is performing said function (at a given time instant).

Functions of various elements shown in the figures, including any functional blocks, such as "means for", "means for receiving", "means for transmitting", "means for providing", "means for determining", may be provided through the use of dedicated hardware, as e.g. a processor, a receiver, a transmitter, a provider, a determiner, etc., as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. An apparatus for a mobile transceiver for a mobile communication system, wherein the mobile transceiver is operable to receive radio signals from two or more base station transceivers, the apparatus comprising:
   a receiver configured to receive radio signals from the two or more base station transceivers, the receiver further having a receive sensitivity determinative of a capability to decode data from a radio signal of one of the two or more base station transceivers when also receiving radio signals from the other of the two or more base station transceivers; and
   a processor configured to provide sensitivity information on the receive sensitivity to an associated base station transceiver.

2. The apparatus of claim 1, wherein the receive sensitivity corresponds to a reception power of a reference signal from a base station transceiver, or wherein the receive sensitivity corresponds to a signal-to-interference-and-noise-ratio between a radio signal received from one of the two or more base station transceivers, the signals received from one or more other base station transceivers and background noise; and/or
wherein a base station transceiver provides one or more radio cells and wherein the sensitivity information relates to a radio cell different from a radio cell the mobile transceiver is associated to.

3. The apparatus of claim 1, wherein the receiver further comprises a signal processor being operable in one or more signal processing modes, wherein the receive sensitivity depends on the signal processing mode.

4. The apparatus of claim 3, wherein one of the one or more signal processing modes corresponds to a successive interference cancellation mode.

5. The apparatus of claim 1, wherein the receiver is operable to update the sensitivity information and wherein the processor is operable to provide updated sensitivity information to the associated base station transceiver.

6. An apparatus for a base station transceiver for a mobile communication system, the apparatus comprising:
a receiver configured to receive sensitivity information on a receiver sensitivity of a mobile transceiver; and
a processor configured to determine configuration information on a measurement configuration for the mobile transceiver, wherein the configuration information comprises information on a signal quality measurement at the mobile transceiver on radio signals received from another base station transceiver, wherein the configuration information comprises bias information for biasing the signal quality measurement, the bias information being based on the sensitivity information.

7. The apparatus of claim 6, further comprising a transmitter configured to transmit configuration information to the mobile transceiver.

8. The apparatus of claim 6, wherein the receiver is operable to receive the sensitivity information from the mobile transceiver and wherein the mobile transceiver is associated to the base station transceiver.

9. The apparatus of claim 8, wherein the processor is further configured to provide the sensitivity information to another base station transceiver.

10. The apparatus of claim 6, wherein the receiver is operable to receive the sensitivity information from another base station transceiver.

11. The apparatus of claim 6, wherein the configuration information refers to measurements relating to a handover between the base station transceiver and another base station transceiver.

12. The apparatus of claim 9, wherein a coverage area of the base station transceiver at least partly surrounds a coverage area of the other base station transceiver and wherein the bias information in the configuration information is such, that the coverage area of the other base station transceiver is enlarged by a measurement using the bias information compared to an unbiased measurement.

13. A method for a mobile transceiver for a mobile communication system, wherein the mobile transceiver is operable to receive radio signals from two or more base station transceivers, the method comprises:
receiving radio signals from the two or more base station transceivers, the receiving having a receive sensitivity determinative of a capability to decode data from a radio signal of one of the two or more base station transceivers when also receiving radio signals from the other of the two or more base station transceivers; and
providing sensitivity information on the receive sensitivity to an associated base station transceiver.

14. A method for a base station transceiver for a mobile communication system comprising two or more base station transceivers, the method comprising:
receiving sensitivity information on a receiver sensitivity of a mobile transceiver; and
determining configuration information on a measurement configuration for the mobile transceiver, wherein the configuration information comprises information on a signal quality measurement at the mobile transceiver on radio signals received from one of the two or more base station transceivers, wherein the configuration information comprises bias information for biasing the signal quality measurement, the bias information being based on the sensitivity information.

15. A non-transitory computer-readable medium having stored thereon a computer program having a program code for performing the method of claim 13, when the computer program is executed on a computer, processor, or programmable hardware component.

16. A non-transitory computer-readable medium having stored thereon a computer program having a program code for performing the method of claim 14, when the computer program is executed on a computer, processor, or programmable hardware component.

17. The apparatus according to claim 1, wherein the receiver is further configured to receive configuration information on a measurement configuration from a base station transceiver, wherein the configuration information comprises configuration information on a signal quality measurement at the mobile transceiver on radio signals received from another base station transceiver, wherein the configuration information comprises bias information for biasing the signal quality measurement, the bias information being based on the sensitivity information.

18. The method according to claim 13, further comprising receiving configuration information on a measurement configuration from a base station transceiver, wherein the configuration information comprises configuration information on a signal quality measurement at the mobile transceiver on radio signals received from another base station transceiver, wherein the configuration information comprises bias information for biasing the signal quality measurement, the bias information being based on the sensitivity information.

* * * * *